US012753733B2

(12) United States Patent
Pfefferle et al.

(10) Patent No.: US 12,753,733 B2
(45) Date of Patent: Oct. 6, 2026

(54) FUEL INJECTION VALVE

(71) Applicant: Robert Bosch GmbH, Stuttgart (DE)

(72) Inventors: David Pfefferle, Knittlingen (DE); Egon Stratmann, Ludwigsburg (DE); Marcus Poindl, Lorch (DE); Ralf Kromer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 18/044,063

(22) PCT Filed: Sep. 9, 2021

(86) PCT No.: PCT/EP2021/074828
§ 371 (c)(1),
(2) Date: Mar. 3, 2023

(87) PCT Pub. No.: WO2022/083936
PCT Pub. Date: Apr. 28, 2022

(65) Prior Publication Data

US 2023/0332568 A1 Oct. 19, 2023

(30) Foreign Application Priority Data

Oct. 22, 2020 (DE) ..................... 10 2020 213 354.9

(51) Int. Cl.

| | |
|---|---|
| ***F02M 51/06*** | (2006.01) |
| ***F02M 61/10*** | (2006.01) |
| ***F02M 61/18*** | (2006.01) |

(52) U.S. Cl.
CPC .......... *F02M 51/061* (2013.01); *F02M 61/10* (2013.01); *F02M 61/1886* (2013.01); *F02M 2200/9015* (2013.01)

(58) Field of Classification Search
CPC .. F02M 51/061; F02M 61/10; F02M 61/1886; F02M 2200/9015; F02M 55/025; F02M 69/04; F02M 63/00; B05B 15/14
See application file for complete search history.

(56) References Cited

U.S. PATENT DOCUMENTS 5,630,400 A * 5/1997 Sumida .................. F02M 61/14 123/470
6,402,061 B1 * 6/2002 Fukutomi ............ F02M 51/061 239/585.5

(Continued)

FOREIGN PATENT DOCUMENTS

CN 1388860 A 1/2003
DE 10359299 A1 8/2005

(Continued)

OTHER PUBLICATIONS

International Search Report for PCT/EP2021/074828, Issued Dec. 3, 2021.

*Primary Examiner* — Christopher R Dandridge
(74) *Attorney, Agent, or Firm* — Norton Rose Fulbright US LLP

(57) ABSTRACT

A fuel injection valve. The fuel injection valve has a support ring is provided on an inlet connection, which engages under the sealing ring on the inlet side. A plastic overmolding forms at least part of a valve housing. The support ring engaging under the sealing ring is positioned on the fuel injection valve in such a way that it rests directly on an upper end face of the plastic overmolding facing the sealing ring, so that the axial support of the sealing ring is provided indirectly via the plastic overmolding. The fuel injection valve is suitable, in particular, for the direct injection of fuel into a combustion chamber of a mixture-compressing external spark-ignition combustion engine.

11 Claims, 6 Drawing Sheets

(56) References Cited

U.S. PATENT DOCUMENTS

| | | | | |
|---|---|---|---|---|
| 2004/0056120 | A1* | 3/2004 | Wieczorek | F02M 51/0671<br>239/585.5 |
| 2016/0281857 | A1* | 9/2016 | Beckmann | F02M 55/004 |

FOREIGN PATENT DOCUMENTS

| | | | |
|---|---|---|---|
| DE | 102017200877 | A1 | 8/2017 |
| DE | 102017207091 | A1 | 1/2018 |
| EP | 3066332 | A1 | 9/2016 |
| JP | 2002285939 | A | 10/2002 |
| JP | 2006138269 | A | 6/2006 |
| JP | 2008095531 | A | 4/2008 |
| JP | 2020528982 | A | 10/2020 |
| WO | 02095215 | A1 | 11/2002 |
| WO | 2013083522 | A1 | 6/2013 |
| WO | 2015067389 | A1 | 5/2015 |

* cited by examiner

FUEL INJECTION VALVE

FIELD

The present invention relates to a fuel injection valve.

BACKGROUND INFORMATION

FIG. 1 shows an example of a fuel injection device from the related art, the inlet connection of which is sealed against the receiving cup of a fuel distribution line by means of a conventional sealing ring made of elastomer. The fuel injection device is particularly suited for use in fuel injection systems of mixture-compressing, spark-ignited internal combustion engines. Numerous fuel injection valves of this type are available; one example to mention is German Patent No. DE 103 59 299 A1.

A fuel injection valve comprising a conical connecting piece on the inlet side is described in German Patent Application No. DE 10 2017 207 091 A1. The connecting piece includes a sealing section, on which an annular sealing element for sealing with respect to the receiving cup of a fuel distribution line. is disposed. The annular sealing element peripherally encloses the sealing section with respect to a longitudinal axis. The annular sealing element is furthermore supported at the lower end of the sealing section by means of a support ring. The sealing section of the connecting piece is configured such that it has a perimeter that increases along the longitudinal axis, i.e. a conicity, at least in the region in which the annular sealing element and the support ring enclose the connecting piece.

SUMMARY

A fuel injection valve having features of the present invention may have the advantage that an improved sealing of an inlet connection with respect to the receiving opening of a fuel distribution line is implemented. For this purpose, according to an example embodiment of the present invention, a support ring is advantageously provided on the inlet connection, which engages under the inlet side sealing ring, wherein the support ring rests directly on an upper end face, facing the sealing ring, of a plastic overmolding which at least partially surrounds the inlet connection, so that the axial support of the sealing ring is provided indirectly via the plastic overmolding.

A particular advantage may be obtained with so-called long valves which, due to their particular installation situation in the cylinder head, have to have a large axial length. According to the present invention, there is no need for additional metallic extensions of the inlet connection, which would also require an additional connection, e.g. in the form of a weld seam. The manufacturing costs of the fuel injection valve can therefore advantageously be reduced.

A further positive aspect is that, even when the fuel injection valve is tilted to the maximum extent possible relative to the connecting piece of the fuel distribution line, metallic contact between the fuel injection valve and the fuel distribution line can be completely ruled out, so that no vibrations of the fuel injection valve are transmitted to other metallic components and thus the risk of undesirable noise is minimized.

The measures disclosed herein enable advantageous further developments and improvements of the fuel injection valve of the present invention.

According to an example embodiment of the present invention, the upper end face of the plastic overmolding advantageously has a conically obliquely extending design, wherein the support ring also comprises a conical inner side which faces toward the upper end face of the plastic overmolding in order to ensure optimized contact of the support ring on the plastic overmolding and an ideal introduction of force.

It is particularly advantageous that the support ring has a V-shaped contact surface facing the sealing ring. According to an example embodiment of the present invention, the support ring acted upon by the sealing ring is provided with this V-shaped conical contact surface for the sealing ring, which ensures that, at increased pressures, the support ring can move away slightly in a radially inward and outward direction and thus radial gaps are always avoided.

According to an example embodiment of the present invention, the support ring advantageously has a slightly larger radial extension in the region with the V-shaped contact surface than over the remaining axial extension of the support ring. The support ring can thus be inserted into the receiving space between the fuel injection valve and the connecting piece with only a small amount of radial pressing in this upper region of the support ring. As a result of the fluid pressure, two force components act via the sealing ring on the two flanks of the V-shaped contact surface of the support ring. These forces cause a slight elastic deformation of the support ring, specifically in the thin-walled regions radially on the inside and on the outside below the contact surface in the radially slightly larger upper region. This prevents the sealing ring from extruding between the support ring and the walls of the receiving opening or the connecting piece, because no undesirable gaps are able to form.

It is of great advantage that at least one peripheral puncture is provided on the outer perimeter of the inlet connection near the upper end face of the plastic overmolding into which the plastic can penetrate during the final overmolding of the plastic overmolding and thus secure the plastic overmolding against axial displacement relative to the inlet connection. For improved introduction of force, it is particularly advantageous if the puncture furthest upstream in axial direction is placed at the level of the conically extending upper end face of the plastic overmolding and thus also in the immediate vicinity of the support ring resting on the conical surface. A major advantage of this design is that, even if the plastic overmolding or the support ring creep, i.e., deform over time and under load, the force is always maintained by axial movement of the support ring in the direction of the combustion chamber.

BRIEF DESCRIPTION OF THE DRAWINGS

Embodiment examples of the present invention are shown in simplified form in the figures and explained in more detail in the following description.

DETAILED DESCRIPTION OF EXAMPLE EMBODIMENTS

Figure 1:
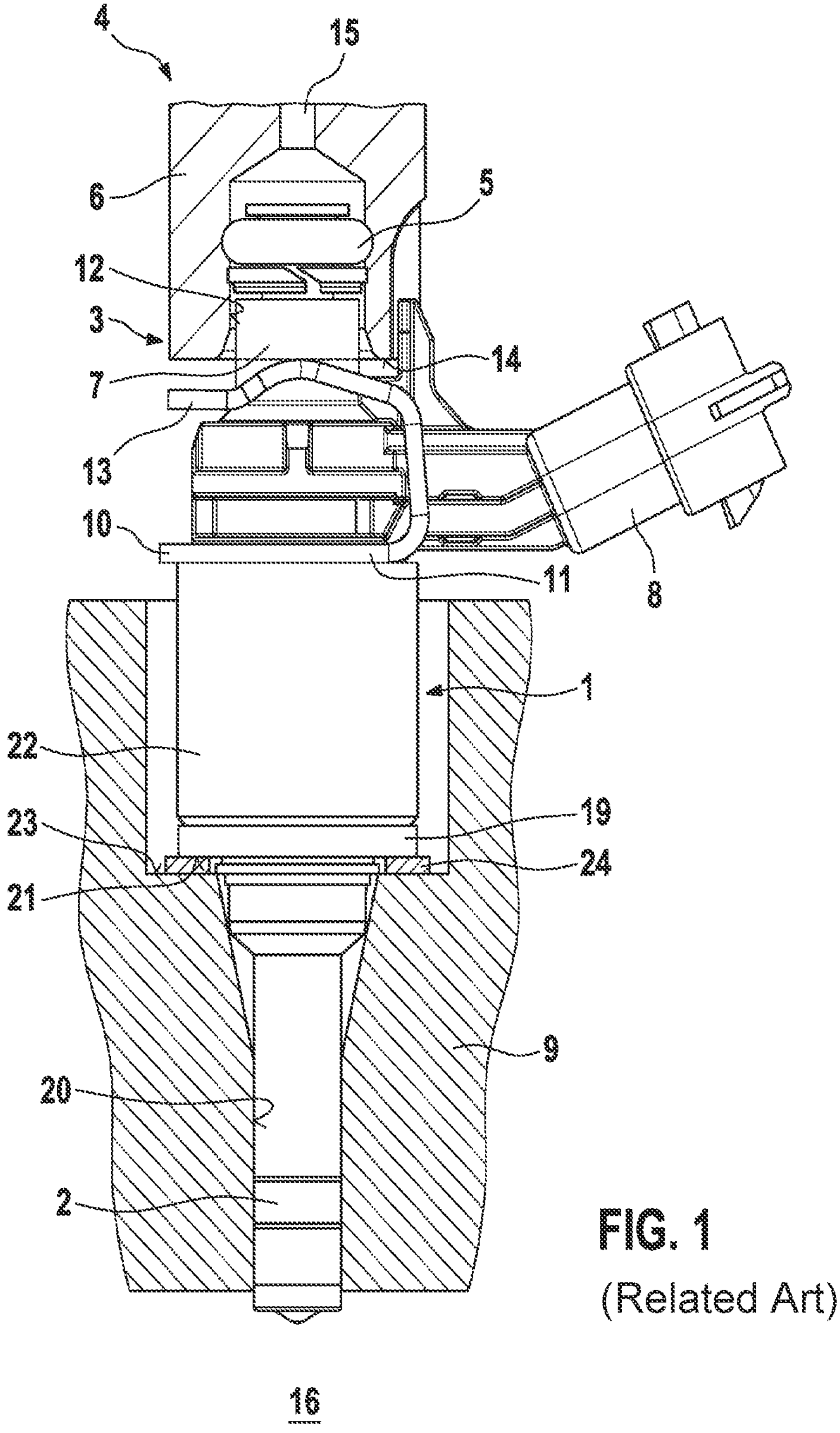
FIG. 1 (Related Art)
FIG. 1 shows a partially depicted fuel injection device in a convention embodiment according to the related art.

To understand the present invention, a conventional embodiment of a fuel injection device will be described in more detail in the following with reference to FIG. 1. FIG. 1 shows a valve in the form of an injection valve 1 for fuel injection systems of mixture-compressing, spark-ignited internal combustion engines in a side view as an embodiment example. The fuel injection valve 1 is part of the fuel injection device. With a downstream end, the fuel injection valve 1, which is embodied in the form of a directly injecting injection valve for injecting fuel directly into a combustion chamber 16 of the internal combustion engine, is installed in a receiving bore 20 of a cylinder head 9. A sealing ring 2, in particular made of PTFE or PTFE with fillers, ensures optimal sealing of the fuel injection valve 1 with respect to the wall of the receiving bore 20 of the cylinder head 9.

Between a step 21 of a valve housing 22 (not shown) or a lower end face 21 of a support element 19 (FIG. 1) and a shoulder 23 of the receiving bore 20 which extends at right angles to the longitudinal extension of the receiving bore 20, for example, an intermediate element 24 which serves as a damping or decoupling element, for example, is inserted. Such an intermediate element 24 also helps to compensate manufacturing and assembly tolerances and ensure mounting free of transverse forces, even if the fuel injection valve 1 is slightly tilted.

At its inlet side end 3, the fuel injection valve 1 comprises a plug connection to a fuel distribution line (fuel rail) 4, which is sealed by a sealing ring 5 between a connecting piece (rail cup) 6 of the fuel distribution line 4 (shown in section) and an 20 inlet connection 7 of the fuel injection valve 1. The fuel injection valve 1 is inserted into a receiving opening 12 of the connecting piece 6 of the fuel distribution line 4. The connecting piece 6 comes out of the actual fuel distribution line 4 in one piece, for example, and has a smaller diameter flow opening 15 upstream of the receiving opening 12, through which the flow to the fuel injection valve 1 takes place. The fuel injection valve 1 comprises an electrical connector plug 8 for electrical contact-connection for actuating the fuel injection valve 1.

The electrical connector plug 8 is connected to a not depicted actuator via corresponding electrical connections, by means of the excitation of which a lifting movement of a valve needle can be achieved, as a result of which an actuation of a valve closing body, which together with a valve seat surface forms a sealing seat, is enabled. These last-mentioned components are not explicitly shown and can have any conventional design. For example, the actuator can be operated electromagnetically, piezoelectrically, or magnetostrictively.

In order to space the fuel injection valve 1 and the fuel distribution line 4 from one another in a largely radial force-free manner and to hold the fuel injection valve 1 down securely in the receiving bore 20 of the cylinder head 9, a hold-down device 10 is provided between the fuel injection valve 1 and the connecting piece 6. The hold-down device 10 is embodied as a bow-shaped component, e.g. as a stamped and bent part. The hold-down device 10 comprises a partially annular base element 11, from which a bent hold-down bracket 13 extends, which rests against a downstream end surface 14 of the connecting piece 6 on the fuel distribution line 4 in the installed state.

Figure 2:
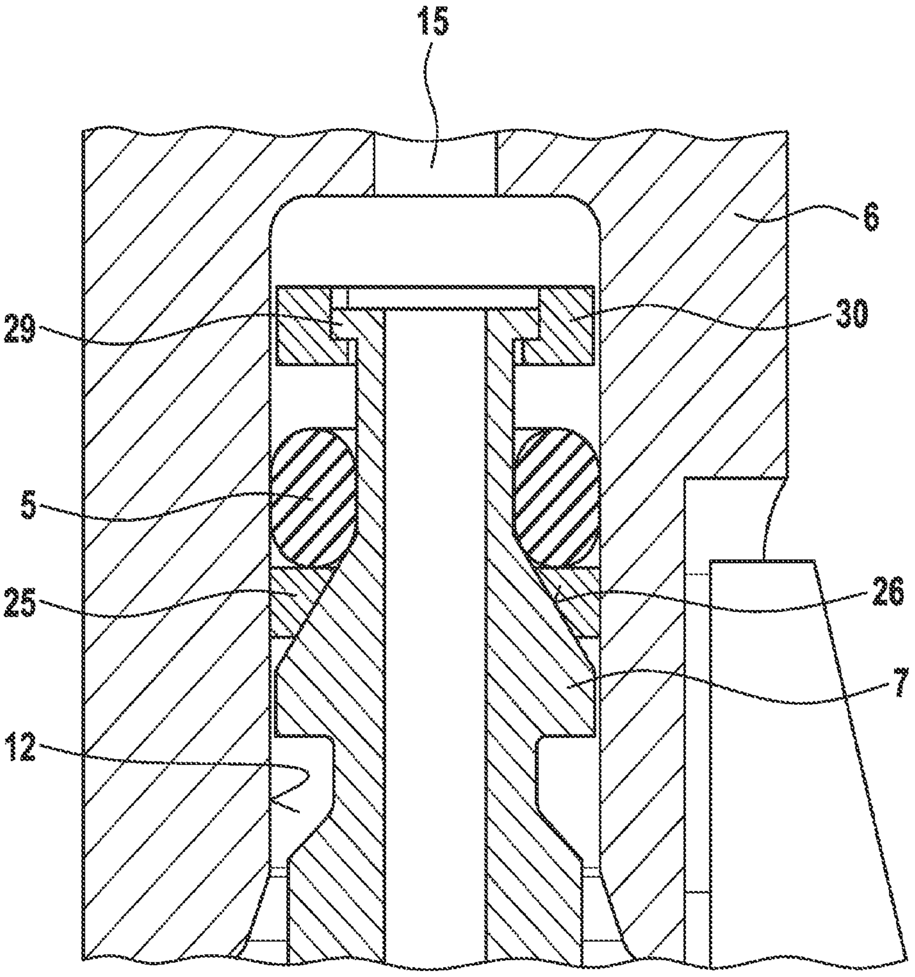
FIG. 2 (Related Art)
FIG. 2 shows a conventional hydraulic interface in the region of a receiving opening of the fuel distribution line, according to the related art.

FIG. 2 shows a conventional hydraulic interface in the region of a receiving opening 12 of the fuel distribution line 4. The sealing ring 5 is braced between the inner wall of the receiving opening 12 and the metallic inlet connection 7, which in the case of so-called long valves having a particularly large axial extension represents an additional attachment part on the actual inlet connection 7. In addition, a support ring 25, which is supported on a conically extending shoulder 26 of the metallic inlet connection 7 or its attachment part, for example, is provided below the sealing ring 5. On the metallic inlet connection 7 of the fuel injection valve 1 shown in FIG. 2, a conically extending portion is thus provided, which is surrounded by the support ring 25 with a likewise conically extending inner opening and partially by the sealing ring 5. Due to the fact that the radial force on the conically extending wall of the inlet connection 7 is divided, among other things, also into an axial force component, there is a risk of the sealing ring 5 slipping upward on one side away from the conical section when the axial force of the support ring 25 is greater than the displacement force of the sealing ring 5. This slippage could be accompanied by a reduced pressing of the sealing ring 5. In this embodiment of the fuel injection valve 1, said fuel injection valve therefore comprises a radial support disk 30 at its inlet side end 3 in the region of an end collar 29 for captive securing. The radial support disk 30 is embodied as a thin but compact disk, which can be made of a plastic (e.g. PEEK, PPS, POM) or a metal (e.g. aluminum). The radial support disk 30 is mounted axially from above on the fuel injection valve 1, for example via an auxiliary mandrel. The radial support disk 30 can alternatively be mounted using an expanding gripper or a similar tool. The radial support disk 30 is thus still disposed in front of the sealing ring 5 when viewed in the direction of flow.

Figure 3:
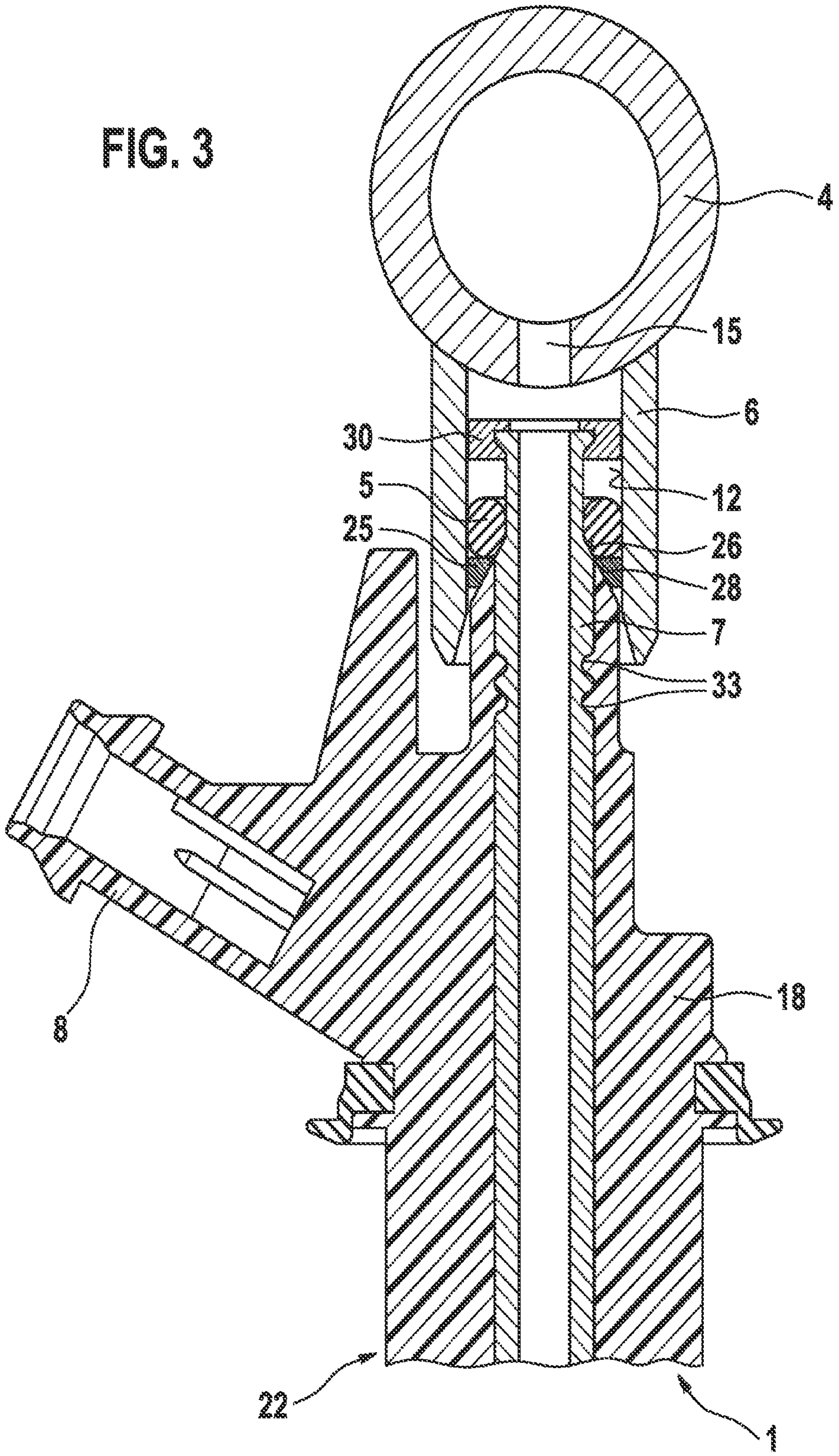
FIG. 3 shows a first hydraulic interface in the region of a receiving opening of the fuel distribution line with a support ring disposed according to an example embodiment of the present invention on a fuel injection valve.

FIG. 3 shows a first hydraulic interface according to the present invention in the region of the receiving opening 12 of the fuel distribution line 4 with a support ring 25 disposed according to the present invention on the fuel injection valve 1. The fuel injection valve 1 comprises a plastic overmolding 18 which forms at least part of the valve housing 22, and, among other things, surrounds the metallic inlet connection 7 over a majority of its extension. According to the present invention, the plastic overmolding 18 extends axially all the way to the hydraulic interface with the fuel distribution line 4. The present invention is characterized in that the support ring 25, which engages under the sealing ring 5 rests directly on an upper end face 28 of the plastic overmolding 18 facing the sealing ring 5, so that the axial support of the sealing ring 5 is provided indirectly via the plastic overmolding 18. in the present case, the upper end face 28 of the plastic overmolding 18 has a conically obliquely extending design. The same applies to the conically extending shoulder 26 of the metallic inlet connection 7. The upper end face 28 of the plastic overmolding 18 and the conically extending shoulder 26 of the metallic inlet connection 7 merge smoothly into one another, for example with the same inclination, and thus form a uniform peripheral upper slanted end of the valve housing 22. Whereas the support ring 25 is in contact only with the upper end face 28 of the plastic overmolding 18, the sealing ring 5 rests on the conically extending shoulder 26 of the metallic inlet connection 7 and, of course, on the upper side of the support ring 25. A, for example peripheral, puncture 33 can be provided in downstream direction on the outer perimeter of the inlet connection 7 at an axial distance to the slanted end of the valve housing 22. A plurality of punctures 33, which are introduced slightly axially spaced apart from one another and ensure that the plastic can penetrate during the final overmolding of the plastic overmolding 18 and thus secure the plastic overmolding 18 against axial displacement relative to the inlet connection 7, are conceivable as well.

Figure 4:
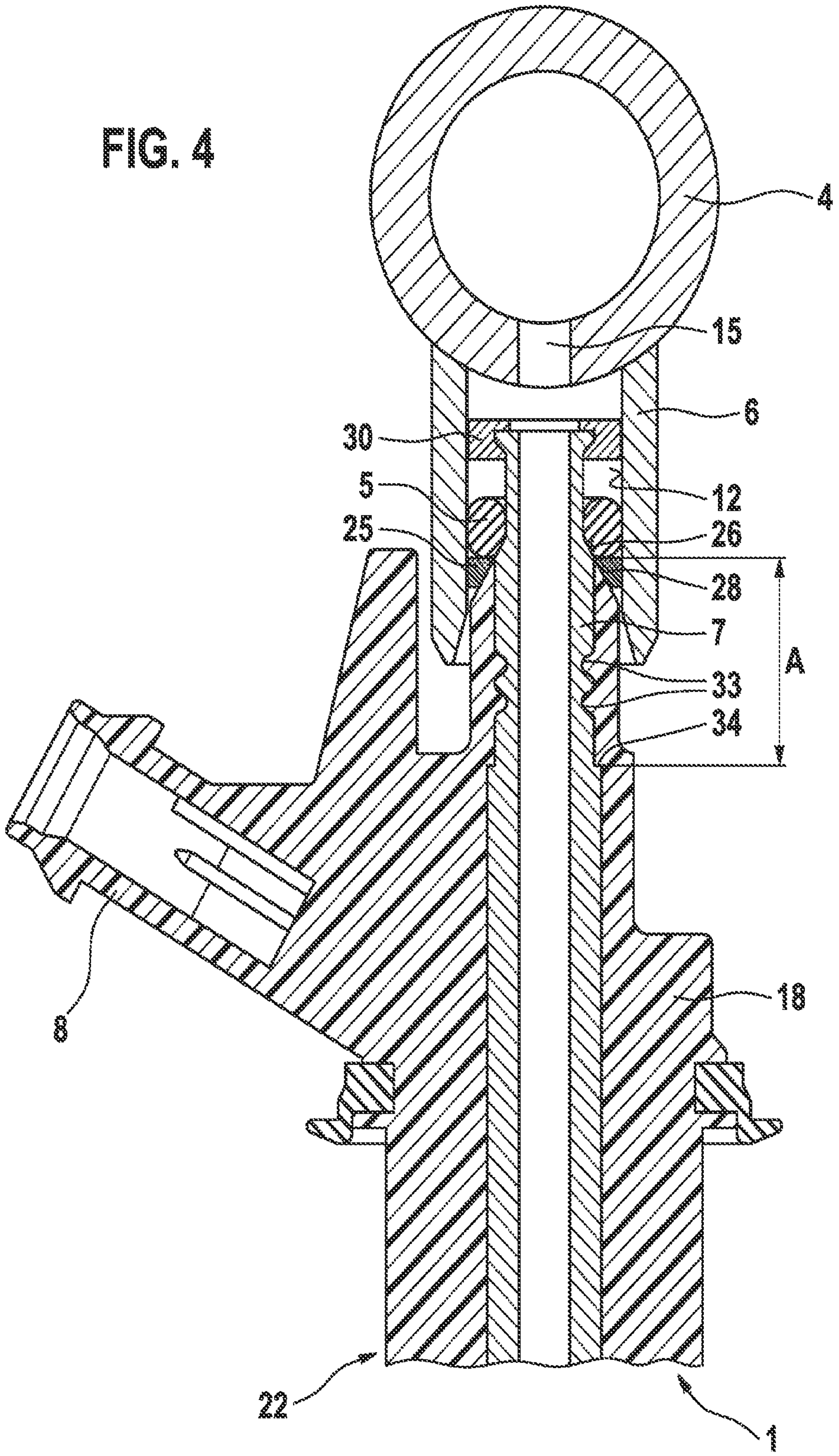
FIG. 4 shows a second hydraulic interface in the region of a receiving opening of the fuel distribution line with a support ring disposed according to an example embodiment of the present invention on a fuel injection valve.

FIG. 4 shows a second hydraulic interface according to the present invention in the region of the receiving opening 12 of the fuel distribution line 4 with a support ring 25 disposed according to the present invention on the fuel injection valve 1. This differs only slightly from the first hydraulic interface according to the present invention shown in FIG. 3. In this embodiment, the inlet connection 7 is characterized by a post-processing, in which a step 34 is produced below the punctures 33 on its outer perimeter, from which, over an axial length A, the inlet connection 7 to the conically extending shoulder 26 of the metallic inlet connection 7 has a smaller outer diameter than the outer diameter downstream of the step 34 of the inlet connection 7. This post-processing can be carried out by means of turning, for example. The outer diameter of the inlet connection 7 is reduced by 0.05 mm to 0.1 mm, for example. This has the advantage of an even further improved sealing of the plastic overmolding 18 with respect to the inlet connection 7.

Figure 5:
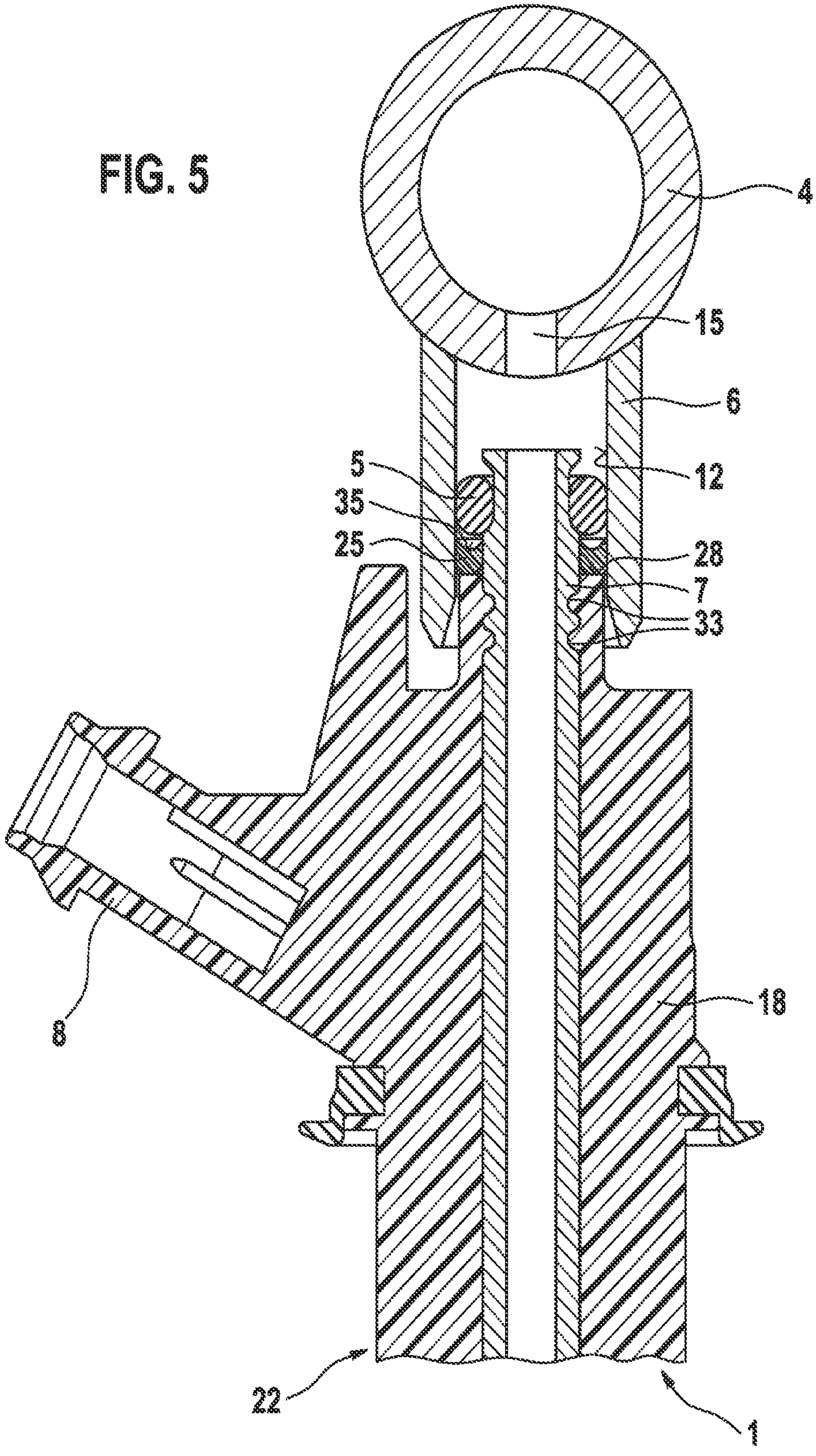
FIG. 5 shows a third hydraulic interface in the region of a receiving opening of the fuel distribution line with a support ring disposed according to an example embodiment of the present invention on a fuel injection valve.

FIG. 5 shows a third hydraulic interface according to the present invention in the region of the receiving opening 12 of the fuel distribution line 4 with a support ring 25 disposed according to the present invention on the fuel injection valve 1. Here, the plastic overmolding 18 is characterized in that the upper end face 28 of the plastic overmolding 18 facing the sealing ring 5 extends flat at right angles to the longitudinal axis of the valve.

In this case, a peripheral support ring 25 disposed according to the present invention is provided, which is pushed onto the inlet connection 7 of the fuel injection valve 1 prior to the optional attachment of an abovementioned radial support disk 30 or some other securing device. The support ring 25 acted upon by the sealing ring 5 is provided with a notch-like and in cross-section V-shaped conical contact surface for the sealing ring 5, which ensures that, at increased pressures, the sealing ring 5 can move away slightly in a radially inward and outward direction and thus radial gaps are avoided. The underside of the support ring 25 rests flat against the upper end face 28 of the plastic overmolding 18, which extends at right angles, and is supported there accordingly.

The support ring 25 is characterized by its V-shaped contact surface 35 for the sealing ring 5. In its upper region with the V-shaped contact surface 35 facing the sealing ring 5, the support ring 25 has a slightly larger radial extension than over the remaining axial extension of the support ring 25 to its underside. The support ring 25 can thus be inserted into the receiving space between the fuel injection valve 1 and the connecting piece 6 with only a small amount of radial pressing in this upper region of the support ring 25. As a result of the fluid pressure, two force components act via the sealing ring 5 on the two flanks of the V-shaped contact surface 35 of the support ring 25. These forces cause a slight elastic deformation of the support ring 25, specifically in the thin-walled regions radially on the inside and on the outside below the contact surface 35 in the radially slightly larger upper region. In the case of increased fluid pressures, therefore, the support ring 25, too, can move away and be pressed in a radially inward and outward direction, so that radial gaps are always avoided.

One or more punctures 33, which are introduced slightly axially spaced apart from one another, can again be introduced on the outer perimeter of the inlet connection 7 at an axial distance from the upper end face 28 of the plastic overmolding 18. They ensure that the plastic can penetrate during the final overmolding of the plastic overmolding 18 and thus secure the plastic overmolding 18 against axial displacement relative to the inlet connection 7.

Figure 6:
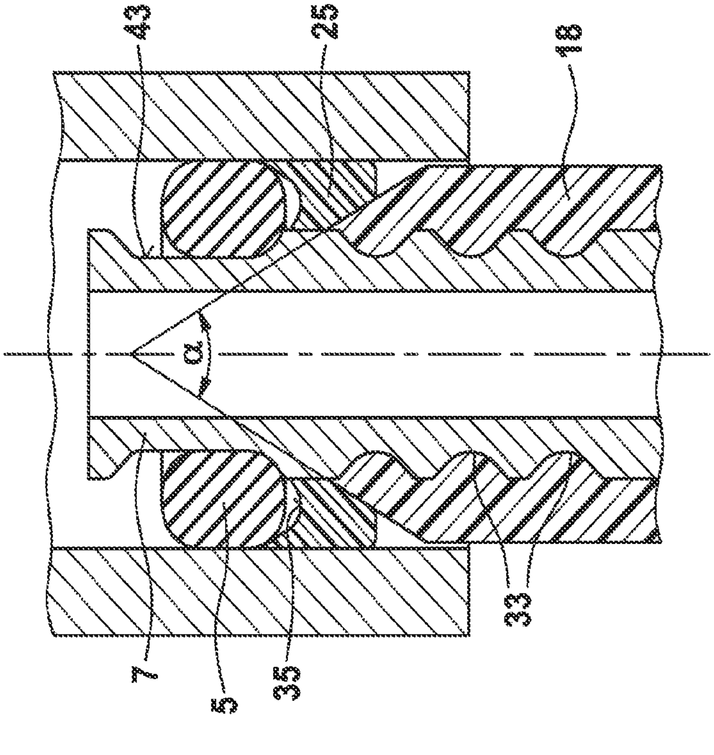
FIG. 6 shows a fourth hydraulic interface in the region of a receiving opening of the fuel distribution line with a support ring disposed according to an example embodiment of the present invention on a fuel injection valve.

FIG. 6 shows a fourth hydraulic interface according to the present invention in the region of the receiving opening 12 of the fuel distribution line 4 with a support ring 25 disposed according to the present invention on the fuel injection valve 1. This embodiment is a combination of the embodiments according to FIG. 3 with a conically inclined upper end face 28 of the plastic overmolding 18 and according to FIG. 5 with a support ring 25 comprising a notch-like and in cross-section V-shaped conical contact surface for the sealing ring 5. Another important aspect according to the present invention is the introduction of the punctures 33 on the inlet connection 33 very close to the upper end face 28 of the plastic overmolding 18. The puncture 33 furthest upstream in axial direction is at the level of the conically extending upper end face 28 of the plastic overmolding 18 and thus also in the immediate vicinity of the support ring 25 resting on the conical surface.

This arrangement enables the plastic overmolding 18 to advantageously transmit significantly higher axial forces to the inlet connection 7 than is the case with more distant puncture positions. The mode of action is as follows. The system pressure acts on the sealing ring 5 which seals between the inlet connection 7 and the connecting piece 6. The sealing ring 5 is thus pressed in the direction of the combustion chamber 16. The sealing ring 5 meets the support ring 25 and pushes it in the direction of the combustion chamber 16 until its conical inner side rests on the likewise conical upper end face 28 of the plastic overmolding 18. At this point, the long cylindrical outer side of the support ring 25 still has a small gap to the connecting piece 6. The high system pressure presses the support ring 25 further in the direction of the combustion chamber 16, wherein the support ring 25 is expanded by the conical contact surface until the largely cylindrical outer side of the support ring 25 rests completely on the inner diameter of the connecting piece 6. The wedge-shaped cross-section of the support ring 25 on the combustion chamber side ensures that the axial force introduced by the sealing ring 5 under system pressure is introduced into the plastic overmolding 18 normal to the conical surface. The force acting on the cone angle can be divided into a radial and an axial force. The axial force component on the plastic overmolding 18 ensures that the support ring 25 does not move any further in the direction of the combustion chamber 16. When the puncture position on the inlet connection 7 is configured according to the present invention, the radial force component on the plastic overmolding 18 ensures that the plastic overmolding 18 is pressed into the puncture or the punctures 33 and the force can be directed into the inlet connection 7 via the punctures 33. A major advantage of this design is that, even if the plastic overmolding 18 or the support ring 25 creep, i.e. deform over time and under load, the force is always maintained by axial movement of the support ring 25 in the direction of the combustion chamber 16.

In the event of a desired conicity, the total angle a of the upper end face 28 of the plastic overmolding 18 with respect to the longitudinal axis of the valve is advantageously between 45° and 85°; ideally the total angle a is approximately 60°. The inclination of the conical inner side of the support ring 25 is correspondingly configured in the same way.

The support ring 25 is advantageously made of a plastic, wherein the material PA66 with 30% glass fibers is suitable, for example. The V-shaped contact surface 35 of the support ring 25 does not have to taper to a point centrally, but can be somewhat rounded in the center at the base, as shown in FIGS. 5 and 6. The angle between the two flanks of the V-shaped contact surface 35 of the support ring 25 is approximately 60° to 100°. The support ring 25 comprises two flanks of the V-shaped contact surface 35 that extend to different heights, for example, wherein the height of the radially inner flank in axial direction is lower than the height of the radially outer flank. This can be advantageous when the sealing ring 5 is inserted into a receiving groove 43 on the inlet connection 7 which is somewhat recessed relative to the support ring 25 and has a smaller diameter.

Figure 7:
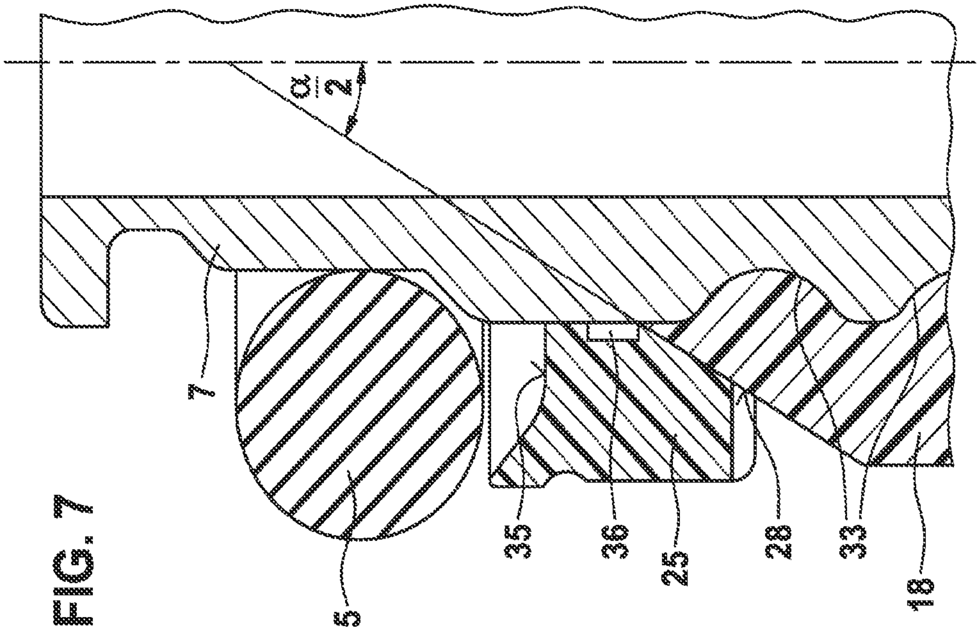
FIG. 7 shows a fifth embodiment according to the present invention of an inlet side valve end with a modified support ring, according to an example embodiment of the present invention.

FIG. 7 illustrates a fifth embodiment according to the present invention of an inlet side valve end, which shows a somewhat modified support ring 25. The support ring 25 is characterized in that, instead of a V-shaped contact surface 35, it comprises a contact surface 35 for the sealing ring 5 facing the sealing ring 5 which is trough-shaped in cross-section. Starting from a radially outer flank, the contact surface 35 initially descends more steeply to then flatten out and extend substantially level to the inner edge of the support ring 25. A peripheral groove 36 is provided on the inner contour of the support ring 25 resting against the inlet connection 7, for example, which prevents the actual cylindrical inner surface of the support ring 25 from slipping onto the inclined surface of the upper end face 28 of the plastic overmolding 18.

The invention claimed is:

1. A fuel injection valve for a fuel injection system of an internal combustion engine, the fuel injector configured to inject fuel directly into the combustion chamber of the internal combustion engine, the fuel injection valve comprising:

an actuator, an excitation of which achieves a lifting movement of a valve needle, as a result of which an actuation of a valve closing body, which together with a valve seat surface forms a sealing seat, is enabled;

an inlet side inlet connection for a supply of fuel;

a sealing ring surrounding the inlet connection on the inlet connection;

a plastic overmolding which forms at least part of a valve housing; and a support ring which engages under the sealing ring and rests directly on a conically extending upper end face of the plastic overmolding facing the sealing ring, so that an axial support of the sealing ring is provided indirectly via the plastic overmolding, wherein axial forces are transmitted by the sealing ring into the plastic overmolding normal to a conical surface of the upper end face of the plastic overmolding, wherein the support ring is supported on a conically extending shoulder, wherein the inlet connection is made of metal and includes the conically extending shoulder, wherein the upper end face of the plastic overmolding and the conically extending shoulder of the inlet connection extend with the same inclination and form a peripheral, uniform, upper slanted end of the valve housing.

2. The fuel injection valve according to claim 1, wherein the upper end face of the plastic overmolding has a conically obliquely extending configuration.

3. The fuel injection valve according to claim 2, wherein the support ring includes a conical inner side which faces toward the upper end face of the plastic overmolding.

4. The fuel injection valve according to claim 1, wherein the upper end face of the plastic overmolding is configured such that it extends flat at right angles to a longitudinal axis of the valve, onto which the support ring is placed flat with its underside.

5. The fuel injection valve according to claim 1, where the support ring includes a contact surface for the sealing ring which facing the sealing ring and is V-shaped in cross-section.

6. The fuel injection valve according to claim 5, wherein the V-shaped contact surface of the support ring includes two flanks on which two force components act via the sealing ring when fluid pressure is applied.

7. The fuel injection valve according to claim 5, wherein the V-shaped contact surface of the support ring is rounded in a center of the V-shaped contact surface.

8. The fuel injection valve according to claim 5, wherein a radially inner flank of the V-shaped contact surface of the support ring is lower in its axial extension than a radially outer flank of the V-shaped contact surface of the support ring.

9. The fuel injection valve according to claim 1, wherein at least one peripheral puncture is provided on the outer perimeter of the inlet connection near the upper end face of the plastic overmolding into which plastic can penetrate during a final overmolding of the plastic overmolding and secures the plastic overmolding against axial displacement relative to the inlet connection.

10. The fuel injection valve according to claim 9, wherein a puncture of the at least one peripheral punction, furthest upstream in axial direction is placed at a level of the upper end face of the plastic overmolding and thus also in an immediate vicinity of the support ring resting on the conical surface.

11. A fuel injection valve for a fuel injection system of an internal combustion engine, the fuel injector configured to inject fuel directly into the combustion chamber of the internal combustion engine, the fuel injection valve comprising:

an actuator, an excitation of which achieves a lifting movement of a valve needle, as a result of which an actuation of a valve closing body, which together with a valve seat surface forms a sealing seat, is enabled;

an inlet side inlet connection for a supply of fuel;

a sealing ring surrounding the inlet connection on the inlet connection;

a plastic overmolding which forms at least part of a valve housing; and a support ring which engages under the sealing ring and rests directly on an upper end face of the plastic overmolding facing the sealing ring, so that an axial support of the sealing ring is provided indirectly via the plastic overmolding, wherein the upper end face of the plastic overmolding extends flat at right angles to a longitudinal axis of the valve, wherein, when fluid pressure from the fuel is applied, two force components act via the sealing ring on flanks of a contact surface of the support ring, whereby the support ring elastically deforms in a radially inward and outward direction so that radial gaps between the support ring and walls of a receiving opening are avoided.

* * * * *